US011964852B1

(12) United States Patent
Zhang et al.

(10) Patent No.: US 11,964,852 B1
(45) Date of Patent: Apr. 23, 2024

(54) ELECTRICALLY PROPELLED TOWING APPARATUS

(71) Applicant: Zhejiang Nowvow Mechanical and Electrical Corp., Ltd., Zhejiang (CN)

(72) Inventors: Litian Zhang, Zhejiang (CN); Chunxiang Zhang, Zhejiang (CN); Jun Zhou, Zhejiang (CN); Renyi Zhang, Zhejiang (CN)

(73) Assignee: ZHEJIANG NOWVOW MECHANICAL AND ELECTRICAL CORP., LTD., Zhejiang (CN)

( * ) Notice: Subject to any disclaimer, the term of this patent is extended or adjusted under 35 U.S.C. 154(b) by 0 days.

(21) Appl. No.: 18/384,933

(22) Filed: Oct. 30, 2023

(30) Foreign Application Priority Data

Aug. 24, 2023 (CN) ......................... 202322296444.1

(51) Int. Cl.
*B66D 3/00* (2006.01)
*B66D 1/22* (2006.01)
*B66D 3/26* (2006.01)

(52) U.S. Cl.
CPC ............... *B66D 3/006* (2013.01); *B66D 1/22* (2013.01); *B66D 3/26* (2013.01)

(58) Field of Classification Search
CPC ............. B66D 3/006; B66D 1/22; B66D 3/26
See application file for complete search history.

(56) References Cited

U.S. PATENT DOCUMENTS

| | | | | | |
|---|---|---|---|---|---|
| 4,096,404 | A * | 6/1978 | Sukhanov | H02K 7/1012 310/67 R | |
| 5,184,807 | A * | 2/1993 | Nikolov | B66D 3/22 254/362 | |
| 6,126,143 | A * | 10/2000 | Fukunaga | B66D 1/22 254/362 | |
| 10,870,562 | B2 * | 12/2020 | Thirunarayana | H02P 6/24 | |
| 10,889,475 | B2 * | 1/2021 | Haley | B66D 1/14 | |
| 11,479,447 | B2 * | 10/2022 | Zhang | B66D 1/22 | |
| 2010/0127229 | A1 * | 5/2010 | Kverneland | B66D 1/22 254/342 | |
| 2021/0139298 | A1 * | 5/2021 | Yu | B66D 1/22 | |

FOREIGN PATENT DOCUMENTS

GB 561660 A * 12/1942 ............... B66D 3/22

* cited by examiner

*Primary Examiner* — Michael R Mansen
*Assistant Examiner* — Nathaniel L Adams
(74) *Attorney, Agent, or Firm* — The PL Law Group, PLLC

(57) ABSTRACT

An electrically propelled towing apparatus includes a housing, in the housing being provided a reel, a stator, and a rotor configured to drive the reel; a mounting cavity is defined in the housing; and the stator is exposed and fixed in the mounting cavity. With elimination of the conventional housing of drive motor, the invention improves heat-dissipation effect.

8 Claims, 7 Drawing Sheets

ELECTRICALLY PROPELLED TOWING APPARATUS

CROSS-REFERENCE TO RELATED APPLICATION AND CLAIM OF PRIORITY

This application claims the benefit under 35 USC § 119 of Chinese Patent Application No. 2023222964441, filed on Aug. 24, 2023, in the China Intellectual Property Office, the entire disclosure of which is incorporated herein by reference for all purposes.

BACKGROUND

1. Field

The subject matter described herein relates to electrically propelled towing technologies, and more particularly relates to an electrically propelled towing apparatus.

2. Background Art

Electrically propelled towing apparatuses are widely applied in various industries. An electrically propelled towing apparatus typically includes a drive motor and a reel, a tow rope being hitched to a to-be-towed object, the drive motor controlling spinning of the reel to bring the tow rope to be wound around the reel, so that the to-be-towed object moves with the tow rope.

In an existing towing apparatus, the reel is sleeved outside an inner cartridge and rotatably connected to the inner cartridge, the drive motor being securely fixed in the inner cartridge; to allow for the inner cartridge to accommodate the drive motor, the inner cartridge is provided with a large diameter, so that the overall size of the electrically propelled towing apparatus cannot be effectively reduced; in addition, the reel is wrapped over the drive motor, which would significantly affect the heat-dissipation property of the drive motor and likely further causes the drive motor to elevate temperature too fast thereby reducing service life of the drive motor.

SUMMARY

To overcome the poor heat dissipation performance of a drive motor in an existing electrically propelled towing apparatus, embodiments of the invention provide an electrically powered towing apparatus, which improves heat-dissipation effect by eliminating a housing of an existing drive motor.

The invention adopts a technical solution infra:

An electrically propelled towing apparatus includes a housing, in the housing being provided a reel, a stator, and a rotor configured to drive the reel, wherein a mounting cavity is defined in the housing, and the stator is exposed and fixed in the mounting cavity.

The invention offers the following benefits:

In this implementation, the stator is directly exposed in the mounting cavity and secured to a side wall of the mounting cavity; the mounting cavity in the housing is directly used as the mounting space for the stator and the rotor, which directly eliminates the conventional housing for the drive motor itself, whereby heat generated from operation of the stator and the rotor may be directly transmitted to the outside via the housing; by eliminating a spacing layer between the stator/rotor and the outside; this may effectively enhance heat dissipation effect of the electrically propelled towing apparatus, reduce the temperate elevation rate of the stator and rotor, reduce the time of the stator and the rotor operating under a high temperature, and facilitate extension of service life of the stator and the rotor.

In some implementations, the housing includes an inner cartridge, the mounting cavity being defined inside the inner cartridge, the reel being sleeved outside the inner cartridge and rotatably connected to the inner cartridge.

In some implementations, the inner cartridge is provided with an opening communicating with the mounting cavity and a rear cover configured to cover the opening, and a supporting seat configured to position the rotor and rotatably connected to the rotor is provided on the rear cover. With this technical solution, the rear cover is adaptable to cover the mounting cavity so that foreign matters do not easily access the mounting cavity affecting operation of the stator and the rotor, allowing for the stator and the rotor to operate normally. In addition, since the rotor is connected to the inside of the mounting cavity via the supporting seat, the rotor can be securely mounted in the mounting cavity and meanwhile the supporting seat can maintain rotating stability of the rotor; moreover, the stator and the rotor may be directly mounted in the mounting cavity via the opening, facilitating mounting and maintenance of the stator and rotor.

In some implementations, the rear cover is provided with a receiving cavity for receiving a control circuit board, the receiving cavity being located at an outer side of the inner cartridge, a cord outlet communicating with the mounting cavity being provided on the rear cover. With this technical solution, the receiving cavity enables fixation of the control circuit board, thereby reducing rocking of the control circuit board, so that the control circuit board is fixed more firmly and reliably; in addition, by mounting the control circuit board to the rear cover and providing a cord outlet on the rear cover, the motor cord in the mounting cavity can be directly connected to the control circuit board via the cord outlet, which may effectively reduce the length of the motor cord, so that circuit layout in the housing is simplified to facilitate mounting and maintenance.

In some implementations, the rear cover is provided with a raised ridge projecting into the mounting cavity, a raised lip being formed by an outer peripheral side of the raised ridge and the rear cover, the raised ridge projecting into the mounting cavity so that the inner cartridge abuts against the raised lip. With this technical solution, by projecting the raised ridge into the mounting cavity, the contact area between the rear cover and the inner cartridge may increase, giving a more stable and reliable connection between the rear cover and the inner cartridge. In addition, the abutting between the inner cartridge and the raised lip allows for limiting the depth of the rear cover projected into the mounting cavity, preventing the rear cover from entirely entering the mounting cavity; secondly, a longitudinal mounting gap is formed between the raised lip and the inner cartridge, and a transverse mounting gap is formed between the raised ridge and a sidewall of the mounting cavity; a curved mounting gap is formed from fitting between the two mounting gaps, which may effectively enhance sealing effect between the rear cover and the inner cartridge, whereby water and moisture do not easily access the inside of the mounting cavity.

In some implementations, an annular groove is provided at the outer peripheral side of the raised ridge and/or at the raised lip, a seal ring being mounted in the annular groove, the rear cover being sealing-fitted with the inner cartridge via the seal ring. With this technical solution, the seal ring may further enhance the sealing effect between the rear cover and the inner cartridge, further effectively reducing possibility of water or moisture ingress into the mounting cavity and thereby extending service life of the stator and the rotor.

In some implementations, the inner cartridge is provided with a shaft hole for a rotary shaft of the rotor to pass through, a supporting seat configured to position the rotary shaft and rotatably connected to the rotary shaft being provided at the shaft hole, the rotary shaft being connected to a connecting shaft sleeve, a convex ring being provided surrounding a peripheral side of the shaft hole, a variable diameter rectangular spring being provided between the convex ring and the connecting shaft sleeve, the variable diameter rectangular spring abutting against an inner wall of the convex ring and an outer sidewall of the connecting shaft sleeve. With this technical solution, when the connecting shaft sleeve rotates forwardly, the variable diameter rectangular spring rotates forwardly along with the connecting shaft sleeve, with the diameter of the variable diameter rectangular spring being shrunk to tightly clasp the surface of the connecting shaft sleeve; at this point, the connecting shaft sleeve rotates normally. When the connecting shaft sleeve rotates reversely, the variable diameter rectangular spring also rotates reversely along with the connecting shaft sleeve, with the diameter of the variable diameter rectangular spring being expanded gradually, causing friction between the variable diameter rectangular spring and the inner wall of the convex ring; under the action of the friction, the connecting shaft sleeve and the inner cartridge maintain fixed relative to each other, further limiting rotation of the connecting shaft sleeve, thereby achieving a braking effect. Moreover, the rotary shaft of the rotor is directly positioned with the inner cartridge via the supporting seat, whereby concentricity between the rotary shaft and the inner cartridge may be improved and rocking of the rotary shaft may also be mitigated, giving a more stable transmission between the rotor and the connecting shaft sleeve.

In some implementations, the housing includes an intermediate body and cover bodies detachably connected to two sides of the intermediate body, respectively, the inner cartridge and the intermediate body being formed of a unitary structure, the reel being sleeved outside the inner cartridge and rotatably connected to the inner cartridge. With this technical solution, the unitary formation of the inner cartridge and the intermediate body may enhance strength and stability of the inner cartridge, increase payload of the reel, cause the reel to rotate more stably, and meanwhile ease formation of the housing.

In some implementations, a reduction mechanism is provided between the reel and the rotor, the reduction mechanism including a planetary gear member and a ring gear member, the planetary gear member being in transmission connection to the rotor and the ring gear member, respectively, the reel being in transmission connection to the ring gear member, the planetary gear member driving the reel to spin via the ring gear member.

In some implementations, a helically-shaped winding groove is provided on a surface of the reel, an end portion of the reel being provided with a transmission part in transmission connection to the ring gear member.

The above and other features and advantages of the invention will be disclosed in more detail in the embodiments below with reference to the accompanying drawings.

BRIEF DESCRIPTION OF THE DRAWINGS

Hereinafter, the invention will be further illustrated with reference to the accompanying drawings.

DETAILED DESCRIPTION

Figure 1:
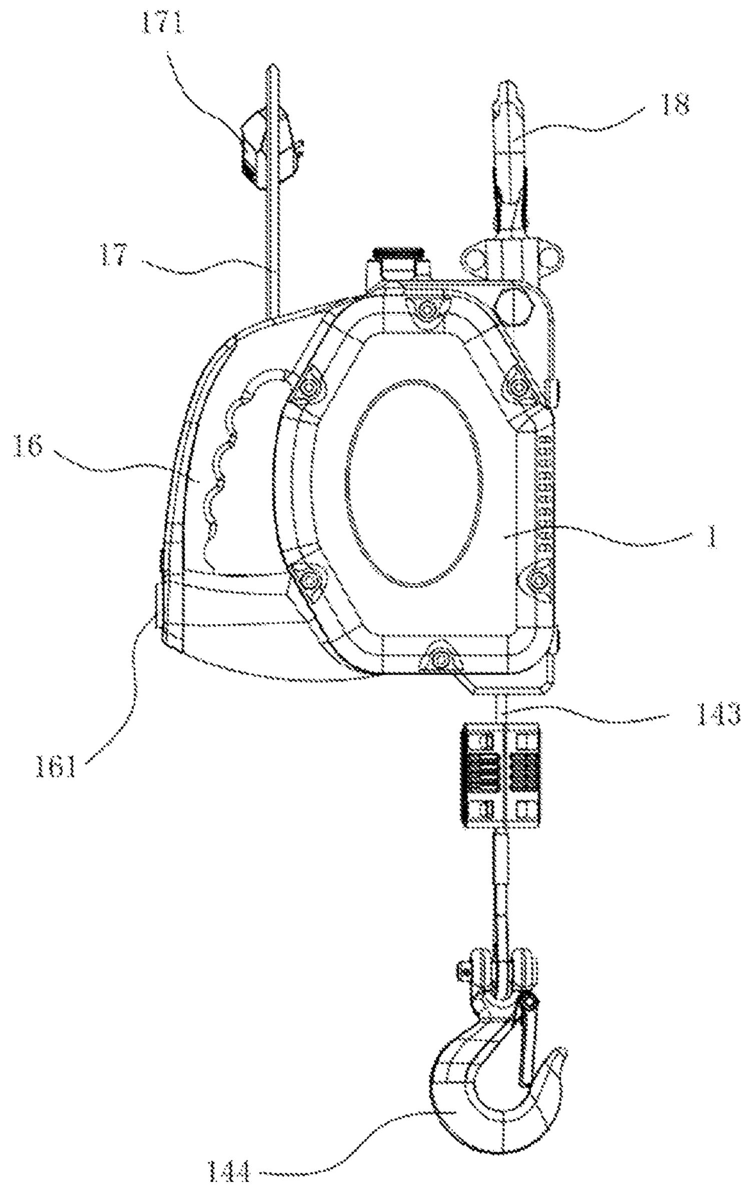
FIG. 1 is a side view of an electrically propelled towing apparatus according to the invention.

Hereinafter, the technical solutions of the invention will be explained and illustrated through embodiments with reference to the accompanying drawings. However, the embodiments are only preferred embodiments of the invention, not all of them. Other embodiments derived by those skilled in the art without exercise of inventive work based on the examples in the embodiments all fall within the protection scope of the invention.

In the description of the invention, it needs to be understood that the orientational or positional relationships indicated by the terms “center,” “longitudinal,” “transverse,” “length,” “width,” “thickness,” “upper,” “lower,” “front,” “rear,” “left,” “right,” “vertical,” “horizontal,” “top,” “bottom,” “inner,” “clockwise,” and “counterclockwise” refer to those orientational and positional relationships illustrated in the drawings, which are intended only for facilitating description of the invention and simplifying relevant depictions, but not for indicating or implying that the devices or elements compulsorily possess such specific orientations or are compulsorily configured and operated with the specific orientations; therefore, such terms should not be construed as limitations to the invention.

Besides, the terms “first” and “second” are only used for descriptive purposes, which shall not be construed as indicating or implying relative importance or implicitly indicating the number of a referred to technical feature. Therefore, the features limited by “first” and “second” may explicitly or implicitly include one or more of such features. In the description of the present invention, unless otherwise indicated, “plurality” indicates two or above.

In the invention, unless otherwise explicitly provided and limited, the terms such as “mount,” “connect,” “attach,” and “fix” should be understood broadly, which, for example, may refer to a fixed connection, a detachable connection, or an integrated connection; which may be a mechanical connection or an electrical connection; which may be a direct connection or an indirect connection via an intermediate medium; which may also be a communication between the insides of two elements. To a person of normal skill in the art, specific meanings of the above terms in the invention may be construed based on specific situations.

As illustrated in FIGS. 1 to 7, embodiments of the invention provide an electrically propelled towing apparatus, including a housing 1, the housing 1 includes an intermediate body 11 and two cover bodies 12, the two cover bodies 12 being detachably connected to two sides of the intermediate body 11, respectively, a first cavity 121 and a second cavity 122 being defined between the intermediate body 11 and the two cover bodies 12, respectively, the intermediate body 11 including an inner cartridge 13, a reel 14, and a stator 21 and a rotor 22 which are configured to drive the reel 14 to spin, the reel 14 being attached with a tow rope 143, the stator 21 and the rotor 22 co-operating to drive the reel 14 to spin so that the tow rope 143 is wound around the reel 14; since the intermediate body 11 is the main stressed portion during operating of the electrically propelled towing apparatus, the intermediate body 11 is made of a metal or metallic alloy with a large strength so as to increase strength of the intermediate body 11.

Figure 3:
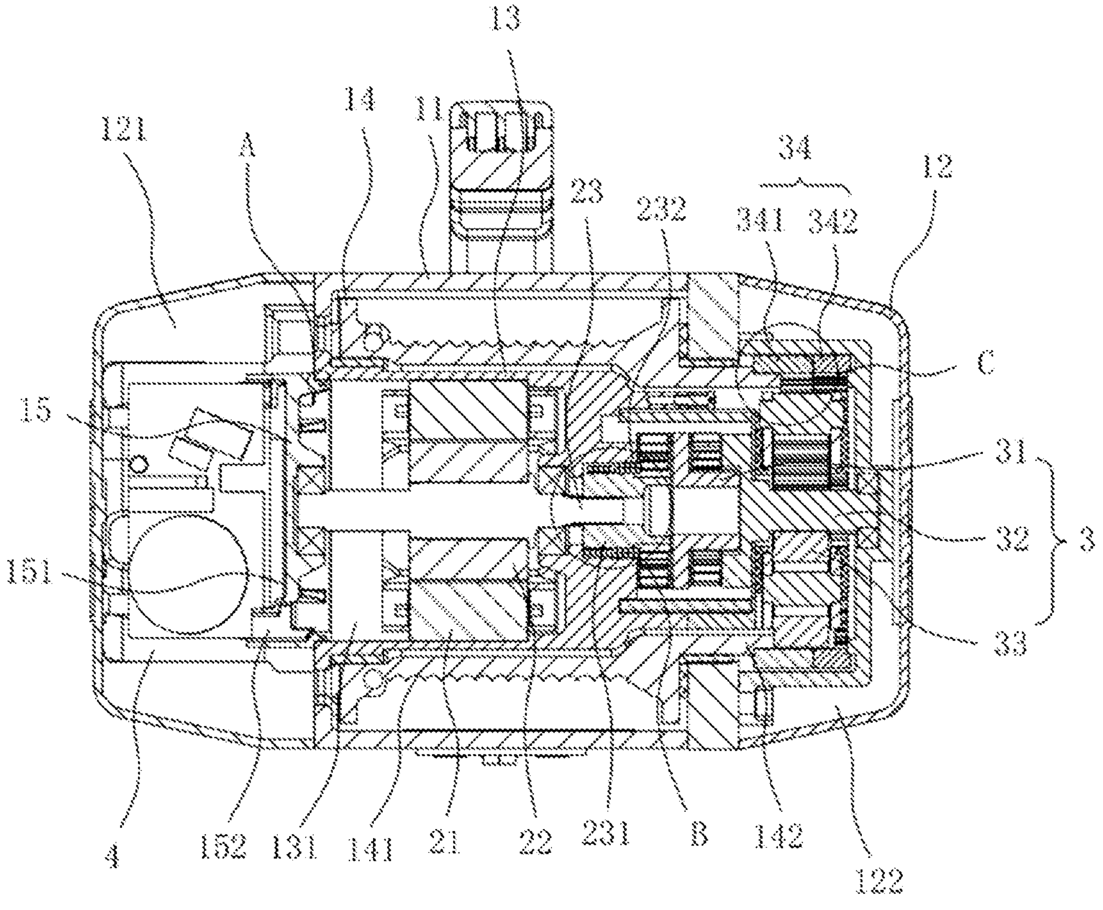
FIG. 3 is a sectional view of a housing in an electrically propelled towing apparatus according to the invention.

As illustrated in FIG. 3, in this implementation, the inner cartridge 13 and the intermediate body 11 are formed of a unitary structure; the reel 14 is sleeved outside the inner cartridge 13; a second bearing is provided between the inner cartridge 13 and the reel 14, the reel 14 being rotatably connected to the inner cartridge 13 via the second bearing; a mounting cavity 131 is defined in the inner cartridge 13, the stator 21 and the rotor 22 being disposed in the mounting cavity 131; a rotary shaft 23 of the rotor 22 is connected to a reduction mechanism 3, the reduction mechanism 3 being in transmission connection to the reel 14; a helical-shaped winding groove 141 is provided on a surface of the reel 14, one end of the tow rope 143 being fixedly connected to the winding groove 141, the other end thereof projecting out of the intermediate body 11; an end portion of the reel 14 is provided with a transmission part 142 in transmission connection to the reduction mechanism 3, so that after the stator 21 and the rotor 22 are activated to cooperate, the rotary shaft 23 drives, via the reduction mechanism 3, the reel 14 to spin about the inner cartridge 13, and spinning of the reel 14 brings the tow rope 143 to be wound into the winding groove 141 on the surface of the reel 14, thereby enabling the tow rope 143 to perform towing.

Figure 2:
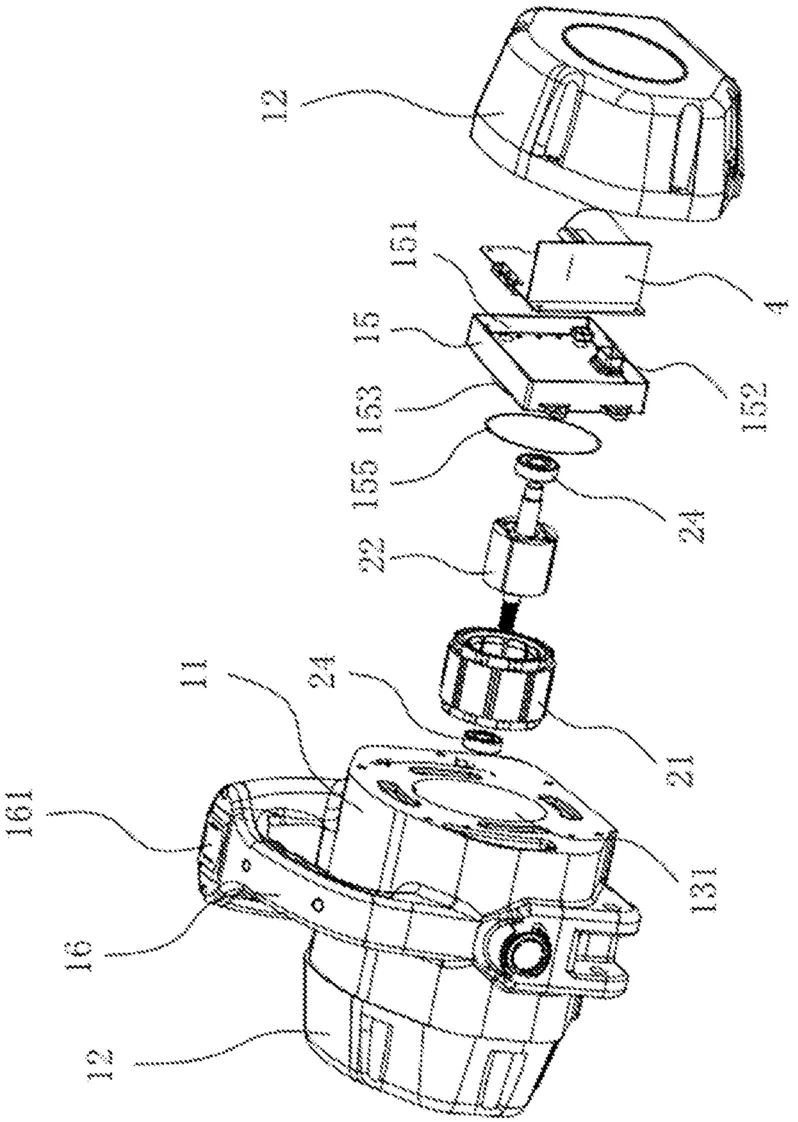
FIG. 2 is an exploded view of an electrically propelled towing apparatus according to the invention.

As illustrated in FIGS. 2 and 3, in this implementation, the stator 21 is exposed and secured to a sidewall of the mounting cavity 131, the rotor 22 being rotatably connected in the mounting cavity 131. In this implementation, an opening allowing for the mounting cavity 131 to communicate with the outside is provided in the axial direction of the inner cartridge 13, a rear cover 15 being fitted at the opening, so that the rear cover 15, after being connected to the inner cartridge 13, covers the opening. A supporting seat is provided at a side of the rear cover 15 facing the mounting cavity 131; in this implementation, the supporting seat refers to a first bearing 24. A shaft hole 133 for the rotary shaft 23 to pass through is provided at a side of the inner cartridge 13 distant from the rear cover 15, and a further first bearing 24 is also mounted at the shaft hole 133, two ends of the rotary shaft 23 of the rotor 22 being fitted to the two first bearing 24, respectively. In the implementation, the rear cover 15 is adaptable to cover the mounting cavity 131 so that foreign matters do not easily access the mounting cavity 131 affecting operation of the stator 21 and the rotor 22, allowing for the stator 21 and the rotor 22 to operate normally. In addition, by setting the rotor 22 to be rotatably connected to the rear cover 15 via the first bearing 24, the rotor 22 can be securely mounted in the mounting cavity 131 and meanwhile the bearing can maintain spinning stability of the rotor 22. Furthermore, the stator 21 and the rotor 22 may be directly mounted in the mounting cavity 131 via the opening, which facilitates mounting and maintenance of the stator 21 and the rotor 22. Moreover, the rotary shaft 23 of the rotor 22 is directly positioned with the inner cartridge 13 via the supporting seat, whereby concentricity between the rotary shaft 23 and the inner cartridge 13 may be improved and rocking of the rotary shaft 23 may also be mitigated, giving a more stable transmission between the rotor 22 and the connecting shaft sleeve 231.

In addition, in this implementation, the inner cartridge 13 is directly used as a housing for the stator 21 and the rotor 22, which may eliminate the conventional housing for the drive motor itself, whereby the mounting space occupied by the stator 21 and the rotor 22 is reduced; this may effectively reduce the overall size of the electrically propelled towing apparatus and facilitate its storage and transportation. Moreover, the inner cartridge 13 is also directly used as the housing for the stator 21 and the rotor 22, so that heat generated from operation of the stator 21 and the rotor 22 may be directly transmitted via the inner cartridge 13, which eliminates a spacing layer between the inside of the mounting cavity 131 and the outside; this may effectively enhance heat dissipation effect of the stator 21 and the rotor 22, reduce the heating-up rate of the stator 21 and the rotor 22, reduce the time of the stator 21 and the rotor 22 operating under a high temperature, and facilitate extension of service life of the stator 21 and the rotor 22.

Figure 4:
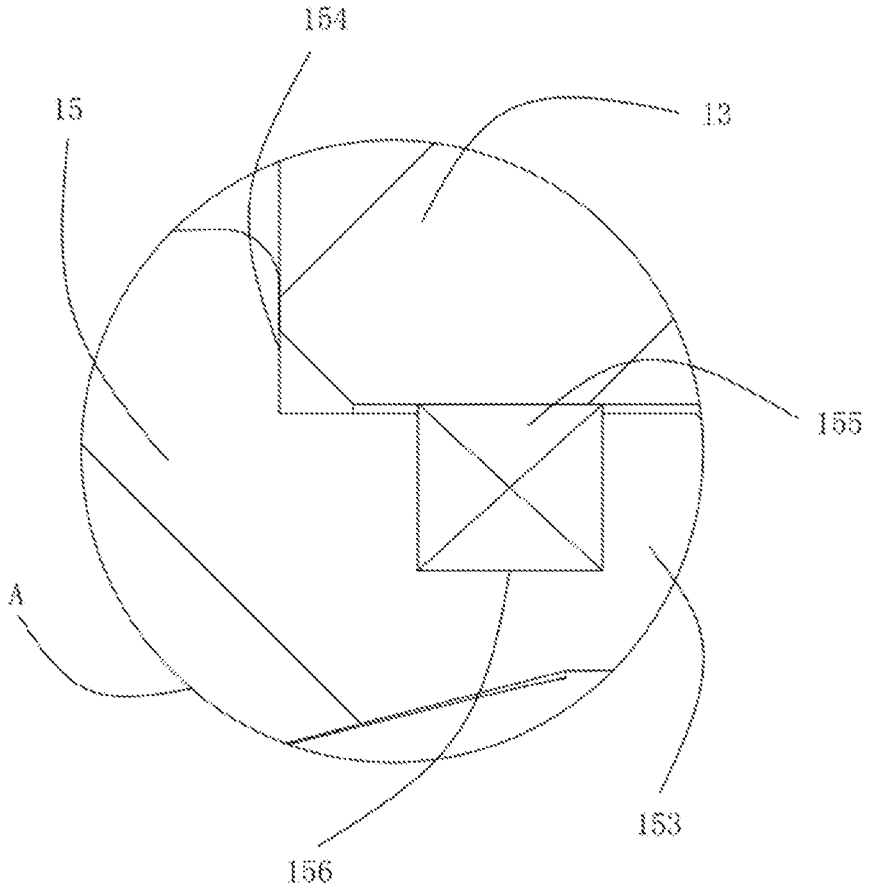
FIG. 4 is a partially enlarged view of portion A in FIG. 3.

As illustrated in FIG. 4, to further enhance sealing performance of the connection between the rear cover 15 and the inner cartridge 13, in this implementation, the rear cover 15 is provided with a raised ridge 153 projecting into the mounting cavity 131, a raised lip 154 being formed by an outer peripheral side of the raised ridge 153 and the rear cover 15, the raised ridge 153 projecting into the mounting cavity 131 so that the inner cartridge 13 abuts against the raised lip 154. By projecting the raised ridge 153 into the mounting cavity 131, the contact area between the rear cover 15 and the inner cartridge 13 may increase, giving a more stable and reliable connection between the rear cover 15 and the inner cartridge 13. In addition, the abut-fitting between the inner cartridge 13 and the raised lip 154 allows for limiting the depth of the rear cover 15 projected into the mounting cavity 131, preventing the rear cover 15 from entirely entering the mounting cavity 131; secondly, after the rear cover 15 and the inner cartridge 13 are connected, a longitudinal mounting gap is formed between the raised lip 154 and the inner cartridge 13, and a transverse mounting gap is formed between the raised ridge 153 and a sidewall of the mounting cavity 131; a curved mounting gap is formed from fitting between the two mounting gaps, which may effectively enhance sealing effect between the rear cover 15 and the inner cartridge 13, whereby water and moisture do not easily access the inside of the mounting cavity 131.

As illustrated in FIG. 4, in this implementation, an annular groove 156 is provided at an outer peripheral side of the raised ridge 153, a seal ring 155 being mounted in the annular groove 156; after the raised ridge 153 projects into the mounting cavity 131, the seal ring 155 and the inner wall of the mounting cavity 131 are fit to seal, so that the seal ring 155 may further enhance the sealing effect between the raised ridge 153 and the sidewall of the mounting cavity 131, further effectively reducing possibility of water or moisture ingress into the mounting cavity and thereby extending service life of the stator 21 and the rotor 22. Of course, it will be understood that, in other implementations, the annular groove 156 may also be provided at the raised lip 154, as illustrated in FIG. 7, i.e., the seal ring 155 is also disposed at the raised lip 154 of the rear cover 15, so that after the rear cover 15 is engagingly fitted with the inner cartridge 13, the inner cartridge 13 abuts against the raised lip 154; at this point, the seal ring 155 is sealing-fitted with the inner cartridge 13.

Figure 7:
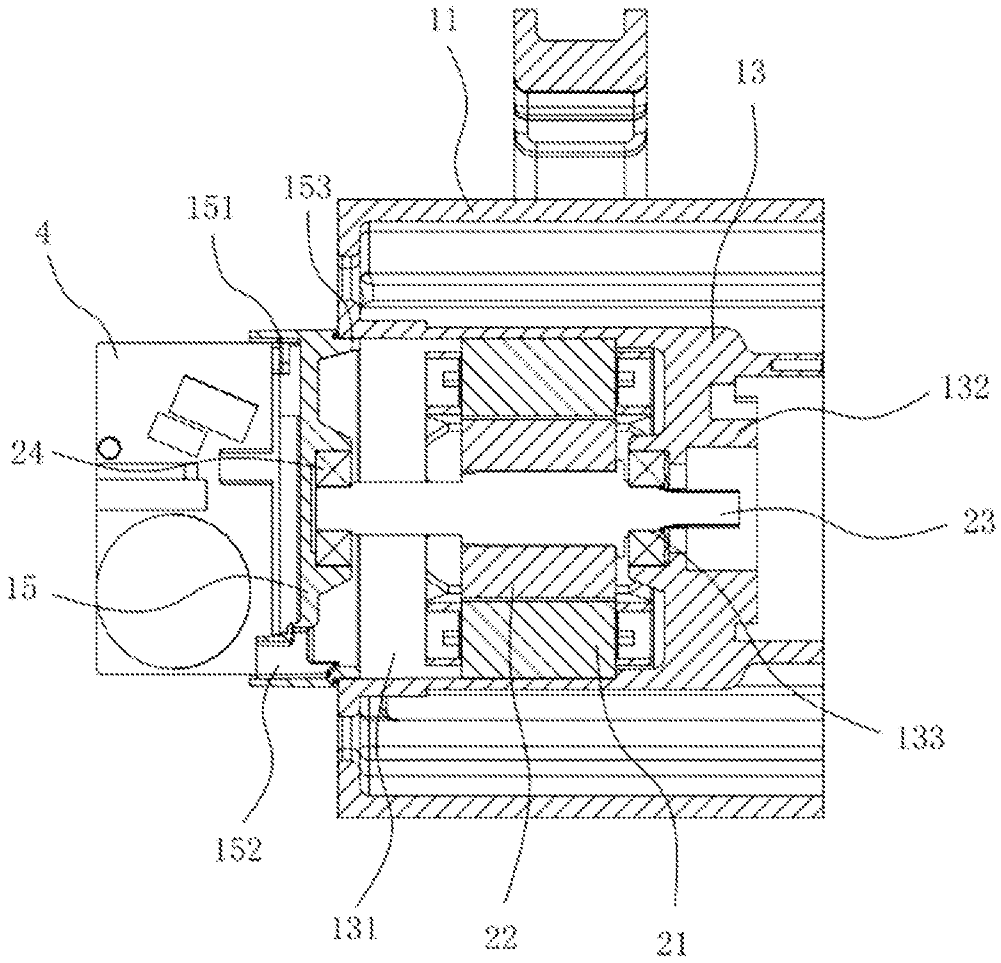
FIG. 7 is a sectional view of an intermediate body of an electrically propelled towing apparatus according to the invention.

As illustrated in FIGS. 3 and 7, in this implementation, the rear cover 15 is provided with a receiving cavity 151 for receiving a control circuit board 4, the receiving cavity 151 being disposed at the outer side of the inner cartridge 13, i.e., the control circuit board 4 is disposed in the first cavity 121 of the housing 1, and a cord outlet 152 communicating with the mounting cavity 131 is provided on the rear cover 15; the control circuit board 4 is securely connected to the rear cover 15 via the receiving cavity 151, which reduces rocking the control circuit board 4, giving a more secure and reliable fixation of the control circuit board 4. The motor cord inside the mounting cavity 131 can be directly connected to the control circuit board 4 via the cord outlet 152, which may effectively reduce the length of the motor cord, so that the circuit layout inside the housing 1 is simplified to facilitate mounting and maintenance. In addition, in this implementation, without the conventional housing of the drive motor, the space occupied by the stator 21 and the rotor 22 in the axial direction may also be shrunk, which provides enough space for mounting the control circuit board 4 and further effectively reduces the length of the housing 1, rendering the electrically propelled towing device more compact and reliable.

Figure 5:
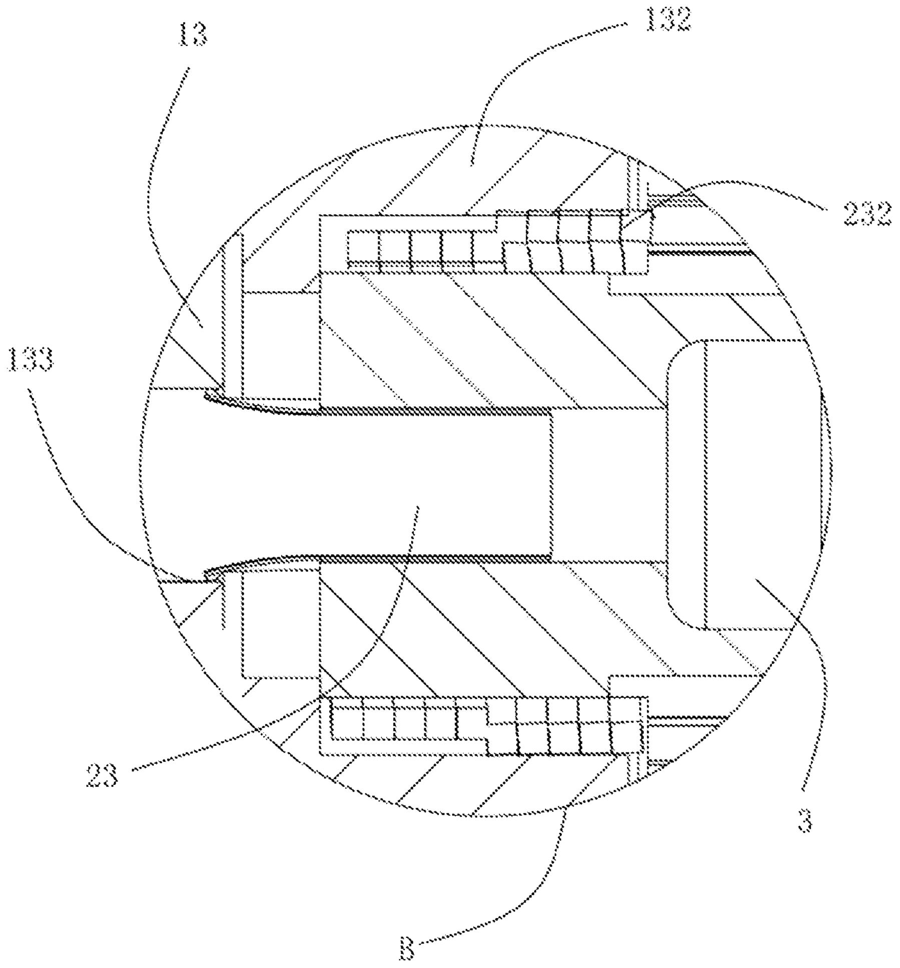
FIG. 5 is a partially enlarged view of portion B in FIG. 3.

As illustrated in FIGS. 3 and 5, in this implementation, the rotary shaft 23 of the rotor 22 is connected to a connecting shaft sleeve 231, and a convex ring 132 is provided surrounding the peripheral side of the shaft hole 133 of the inner cartridge 13; an interval is present between the convex ring 132 and the connecting shaft sleeve 231, a variable-diameter rectangular spring 232 being inserted in the interval between the convex ring 132 and the connecting shaft sleeve 231, the variable diameter rectangular spring 232 abutting against the inner wall of the convex ring 132 and the outer sidewall of the connecting shaft sleeve 231, respectively, so that when the connecting shaft sleeve 231 rotates forwardly, the variable diameter rectangular spring 232 rotates forwardly along with the connecting shaft sleeve 231, with the diameter of the variable diameter rectangular spring 232 being shrunk to tightly clasp the surface of the connecting shaft sleeve 231; at this point, the connecting shaft sleeve 231 rotates normally. When the connecting shaft sleeve 231 rotates reversely, the variable diameter rectangular spring 232 also rotates reversely along with the connecting shaft sleeve 231, with the diameter of the variable diameter rectangular spring 232 being expanded gradually, causing friction between the variable diameter rectangular spring 232 and the inner wall of the convex ring 132; under the action of the friction, the connecting shaft sleeve 231 and the inner cartridge 13 maintain fixed relative to each other, further limiting rotation of the connecting shaft sleeve 231, thereby achieving a braking effect.

Figure 6:
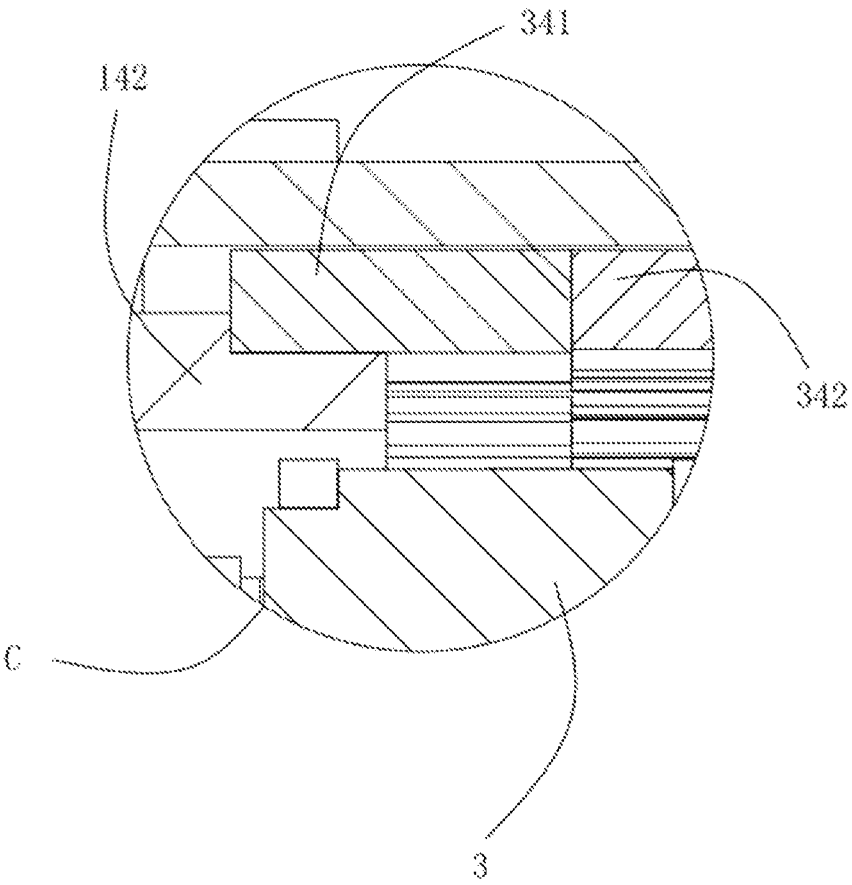
FIG. 6 is a partially enlarged view of portion C in FIG. 3.

As illustrated in FIGS. 3 and 6, in this implementation, the reduction mechanism 3 and the rotary shaft 23 of the rotor 22 are in transmission connection, the reduction mechanism 3 being disposed at a side of the inner cartridge 13 distant from the rear cover 15, i.e., the reduction mechanism 3 being disposed in the second cavity 122 of the housing 1; the reduction mechanism 3 including a first-stage planetary gear 31, a second-stage planetary gear 32, a third-stage planetary gear 33, and a ring gear member 34, the connecting shaft sleeve 231 being in transmission connection to the first-stage planetary gear 31, the first-stage planetary gear 31 including a first sun gear, a first star wheel, and a first connecting shaft, the connecting shaft sleeve 231 being connected to the first sun gear, the first sun gear being in transmission connection to the first star gear, the first star gear being in transmission connection to a ring gear of the first connecting shaft, so that upon activation of the stator 21 and the rotor 22, the rotary shaft 23 rotates to bring the connecting shaft sleeve 231 to rotate, and the first sun gear rotates synchronously with the connecting shaft sleeve 231 and brings the first connecting shaft to rotate via the first star gear, thereby realizing first-stage speed reduction.

In this implementation, the second-stage planetary gear 32 includes a second sun gear, a second star gear, and a second connecting shaft, the first connecting shaft being connected to the second sun gear, the second sun gear being in transmission connection to the second star gear, the second star gear being in transmission connection to a ring gear of the second connecting shaft, so that rotating of the first connecting shaft brings the second sun gear to rotate, and the second sun gear brings the second connecting shaft to rotate via the second star gear, further realizing a second-stage speed reduction.

In this implementation, the third-stage planetary gear 33 includes a third sun gear and a third star gear, the second connecting shaft being connected to the third sun gear, the third sun gear being in transmission connection to the third star gear, the third star gear being in transmission connection to the ring gear member 34, the ring gear member 34 including a stationary ring gear 342 and a movable ring gear 341, the stationary ring gear 342 maintaining stationary relative to the inner cartridge 13, the movable ring gear 341 being in meshed transmission with a transmission part 142 of the reel 14. It is noted that the third-stage planetary gear 33 refers to a set of planetary gears with small teeth difference; when the third sun gear rotates forwardly, the third star gear rotates with the third sun gear to further bring the movable ring gear 341 to rotate, so that the movable ring gear 341 transmits the rotating power to the reel 14 via the transmission part 142, whereby winding of the tow rope 143 is implemented; when the third sun gear rotates reversely, the third star gear will be seized under the action of the stationary ring gear 342, which may limit the third star gear from rotating, thereby achieving a braking effect.

As illustrated in FIG. 1, in this implementation, a rope outlet for the tow rope 143 to access is provided on the housing 1, an end portion of the tow rope 143 being provided with a movable hook 144, an anchor hook 18 being provided on the housing 1, the anchor hook 18 and the rope outlet being disposed at two sides of the housing 1, respectively; in addition, the anchor hook 18 and the rope outlet are both disposed at the intermediate body 11; in use, the movable hook 144 is attached to a to-be-towed object, and the anchor hook 18 is attached to a support object; upon activation of the stator 21 and the rotor 22, the to-be-towed object is moved.

As illustrated in FIG. 1, in this implementation, a grip handle 16 convenient for a user to grip is provided on the housing 1, a switch button 161 being provided on the grip handle 16, the switch button 161 being electrically connected to the control circuit board 4; by pressing the switch button 161, activation/deactivation of the stator 21 and the rotor 22 may be controlled. In addition, in this implementation, the stator 21 and the rotor 22 cooperate to form an alternating-current motor. A power cord 17 is provided on the housing 1, a power plug 171 being provided at an end portion of the power cord 17; the power plug 171 is connected to the external power grid to power the stator 21 and the rotor 22; of course, it will be understood that in other implementations, the stator 21 and the rotor 22 may also cooperate to form a direct-current motor; a battery supplying power to the stator 21 and the rotor 22 may also be provided on the housing 1; the battery may be detachably connected to the housing 1. Furthermore, to improve use safety in this implementation, an emergency stop button is provided at the outer side of the housing 1; by pressing the emergency off button, the electrically propelled towing apparatus can be emergently turned off, thereby providing a higher safety in using the electrically propelled towing apparatus.

What have been described above are only embodiments of the invention; however, the protection scope of the invention is not limited thereto. A person skilled in the art should understand that the invention includes, but is not limited to, the contents described in the drawings and the embodiments. Any modifications without departing from the functions and structural principles of the invention will be included within the scope of the claims.

What is claimed is:

1. An electrically propelled towing apparatus comprising:

a housing, in the housing being provided a reel, a stator, and a rotor configured to drive the reel, wherein a mounting cavity is defined in the housing, and the stator is exposed in the mounting cavity and fixed in the mounting cavity, the housing comprising an inner cartridge, wherein the inner cartridge is provided with a shaft hole for a rotary shaft of the rotor to pass through, a supporting seat configured to position the rotary shaft and rotatably connected to the rotary shaft being provided at the shaft hole, the rotary shaft being connected to a connecting shaft sleeve, a convex ring being provided surrounding a peripheral side of the shaft hole, a variable diameter rectangular spring being provided between the convex ring and the connecting shaft sleeve, the variable diameter rectangular spring abutting against an inner wall of the convex ring and an outer sidewall of the connecting shaft sleeve.

2. The electrically propelled towing apparatus according to claim 1, wherein the mounting cavity is defined inside the inner cartridge, and the reel is sleeved outside the inner cartridge and rotatably connected to the inner cartridge.

3. The electrically propelled towing apparatus according to claim 2, wherein the inner cartridge is provided with an opening communicating with the mounting cavity and a rear cover configured to cover the opening, and a supporting seat configured to position the rotor and rotatably connected to the rotor is provided on the rear cover.

4. The electrically propelled towing apparatus according to claim 3, wherein the rear cover is provided with a receiving cavity for receiving a control circuit board, the receiving cavity being located at an outer side of the inner cartridge, a cord outlet communicating with the mounting cavity being provided on the rear cover.

5. The electrically propelled towing apparatus according to claim 3, wherein the rear cover is provided with a raised ridge projecting into the mounting cavity, a raised lip being formed by an outer peripheral side of the raised ridge and the rear cover, the raised ridge projecting into the mounting cavity so that the inner cartridge abuts against the raised lip.

6. The electrically propelled towing apparatus according to claim 2, wherein the housing comprises an intermediate body and a cover body detachably connected to either of two sides of the intermediate body, the inner cartridge and the intermediate body being formed of a unitary structure, the reel being sleeved outside the inner cartridge and rotatably connected to the inner cartridge.

7. The electrically propelled towing apparatus according to claim 1, wherein a reduction mechanism is provided between the reel and the rotor, the reduction mechanism comprising a planetary gear member and a ring gear member, the planetary gear member being in transmission connection to the rotor and the ring gear member, respectively, the reel being in transmission connection to the ring gear member, the planetary gear member driving the reel to spin via the ring gear member.

8. The electrically propelled towing apparatus according to claim 7, wherein a helically-shaped winding groove is provided on a surface of the reel, an end portion of the reel being provided with a transmission part in transmission connection to the ring gear member.

* * * * *